(12) United States Patent
Wintzell et al.

(10) Patent No.: US 9,524,174 B2
(45) Date of Patent: Dec. 20, 2016

(54) CONFIGURATION ASSISTANT FOR A CONTROL SYSTEM WITHIN AN OPERATIONAL ENVIRONMENT

(71) Applicant: Axis AB, Lund (SE)

(72) Inventors: Petter Wintzell, Lund (SE); Carl-Ola Boketoft, Södra Sandby (SE)

(73) Assignee: Axis AB, Lund (SE)

( * ) Notice: Subject to any disclaimer, the term of this patent is extended or adjusted under 35 U.S.C. 154(b) by 562 days.

(21) Appl. No.: 14/028,118

(22) Filed: Sep. 16, 2013

(65) Prior Publication Data

US 2015/0081928 A1 Mar. 19, 2015

(51) Int. Cl.
*G06F 13/00* (2006.01)
*G06F 9/44* (2006.01)
*G06F 13/40* (2006.01)
*G05B 19/042* (2006.01)
*G06F 13/10* (2006.01)

(52) U.S. Cl.
CPC ......... *G06F 9/4411* (2013.01); *G05B 19/0426* (2013.01); *G06F 13/102* (2013.01); *G06F 13/409* (2013.01); *G05B 2219/23273* (2013.01)

(58) Field of Classification Search
USPC ......... 710/300–315, 104–110; 709/202–203, 709/220–222
See application file for complete search history.

(56) References Cited

U.S. PATENT DOCUMENTS 5,812,394 A * 9/1998 Lewis ............... G05B 19/0426
700/17
6,185,613 B1 * 2/2001 Lawson ................. G06F 9/542
709/224

(Continued)

FOREIGN PATENT DOCUMENTS

DE 10140748 A1 3/2003
EP 2089925 A1 9/2009

(Continued)

OTHER PUBLICATIONS

Assa Abloy. "An Expert Configurator for Creating Electronically Accessed Openings". Securitron Magnalock Corporation (2013).

(Continued)

*Primary Examiner* — Raymond Phan
(74) *Attorney, Agent, or Firm* — Snyder, Clark, Lesch & Chung, LLP

(57) ABSTRACT

A method configures an installation of a control system within an operational environment, where the control system may include distributed physical access control system. The method may provide options for installing peripheral devices compatible with a controller, and receive selections based on the provided options. The selections may be associated with an operational environment of at least one selected peripheral device. The method may generate instructions to command the controller to specify individual pins from a plurality of pins for connecting the controller to at least one selected peripheral device. The method may subsequently create a report to describe connections between the specified individual pins associated with the controller and wires associated with at least one selected peripheral device. An apparatus can implement the method to configure the installation of the control system in its operational environment.

25 Claims, 14 Drawing Sheets

(56) References Cited

U.S. PATENT DOCUMENTS

| | | | | |
|---|---|---|---|---|
| 2003/0101426 | A1* | 5/2003 | Sarkinen | H04L 45/00 716/126 |
| 2004/0059856 | A1* | 3/2004 | Chan | G06F 13/409 710/301 |
| 2005/0289250 | A1* | 12/2005 | Mulla | G06F 13/4027 710/9 |
| 2008/0244147 | A1* | 10/2008 | Chen | G06F 13/4081 710/313 |

FOREIGN PATENT DOCUMENTS

| | | |
|---|---|---|
| EP | 2098924 B1 | 9/2009 |
| EP | 2098926 A1 | 9/2009 |
| EP | 2098926 B1 | 9/2009 |
| EP | 2098928 A1 | 9/2009 |
| EP | 2343611 A1 | 7/2011 |

OTHER PUBLICATIONS

EntryPass. "Hybrid Input / Output Control Panel". www.entrypass.net (2013).

Interlogix TruPortal. "Access Control Designed Simply for You" www.interlogix.com (Feb. 2012).

Interlogix TruPortal. "Access Control" www.interlogix.com (Feb. 2012).

European Search Report, dated Aug. 7, 2014, issued in corresponding European application 13185561.1-1802, 8 pages.

Office Action issued in corresponding EP Application No. 13185561.1 mailed on Mar. 1, 2016, 4 pages.

Applicant response to Office Action in corresponding EP Application No. 13185561.1 filed on Jun. 1, 2016, 19 pages.

Applicant response to Extended European Search Report in corresponding EP Application No. 13185561.1 filed on Feb. 5, 2015, 20 pages.

* cited by examiner

702 — SET CONTROLLER AND PERIPHERAL DEVICE NAMES

Controller Name: Hardware Lab Controller J2

Number of Peripheral Devices: 2

Peripheral Device No. 1 - Name: Hardware Lab Door Lock

Peripheral Device No. 2 - Name: Hardware Lab Reader

Cancel    Next

704 — CONFIGURE PERIPHERAL DEVICE: Hardware Lab Door Lock

Peripheral Device Type: DOOR LOCK
- DOOR LOCK
- READER
- SENSOR
- ACTUATOR

Type of DOOR LOCK: Dual Lock
- Single Lock
- Dual Lock

Number of Doors: 1
- 1
- 2
- 3

Lock 1:
- ● 12 V    Locked GND – Unlocked 12V
- ○ Relay   Locked relay open – Unlocked relay closed Lock 2:
- ○ 12 V    Locked GND – Unlocked 12V
- ● Relay   Locked relay open – Unlocked relay closed Cancel    Next

CONFIGURE PERIPHERAL DEVICE: Hardware Lab Reader

Peripheral Device Type: | READER ▼ |
| DOOR LOCK |
| READER |
| SENSOR |
| ACTUATOR |

Type of READER: | Card ▼ |
| Card |
| Keypad |

Entering reader:
☑ Reader

Entering reader protocol:
○ Wiegand
○ RS485 half duplex [OSDP ▼]
◉ RS485 full duplex [HADP ▼]

Entering REX:
☐ REX

Entering reader connection:
○ Active Low
○ Active High

Exiting reader:
☑ Reader

Exiting reader protocol:
◉ Wiegand
○ RS485 half duplex [OSDP ▼]
○ RS485 full duplex [OSDP ▼]

Exiting REX:
☑ REX

Exiting reader connection:
○ Active Low
◉ Active High

[ Cancel ]  [ Next ]

FIG. 7B

CONFIGURATION ASSISTANT FOR A CONTROL SYSTEM WITHIN AN OPERATIONAL ENVIRONMENT

FIELD

This disclosure generally relates to approaches for assisting in the installation and configuring of a control system in an operational environment. In various embodiments, a configuration assistant can guide a user in installing and configuring a distributed physical access control system in a particular environment.

BACKGROUND INFORMATION

Data collection and control systems are increasingly being used across a spectrum of applications to monitor and/or control various spaces, facilities, and/or processes. These systems can take advantage of a wide variety of peripheral devices to facilitate various monitoring and control operations. While having a large variety of different types of peripheral devices can improve the functionality and flexibility of these control systems, it can increase the complexity of installing and configuring such systems in their operational environments.

SUMMARY

One embodiment disclosed below includes a method for configuring an installation of a control system within an operational environment. The method may provide options for installing peripheral devices compatible with a controller, and receive selections based on the provided options. The selections may be associated with an operational environment of at least one selected peripheral device. The method may further generate instructions to command the controller to specify individual pins from a plurality of pins for connecting the controller to the at least one selected peripheral device. The method may create a report to describe connections between the specified individual pins associated with the controller and wires associated with the at least one selected peripheral device. When specifying individual pins from the plurality of pins, the controller may be commanded to select the individual pins from the plurality of pins, and electrically configure at least one individual pin from the plurality of pins.

In another embodiment, the method may execute on the controller, and may further include determining, based on the generated instructions, a pin configuration for connecting the controller to the at least one selected peripheral device, establishing connections within the controller to individual pins based on the determined pin configuration, and providing the created report to an administration device, where the created report may be based on determined pin configuration.

In yet another embodiment, determining the pin configuration may further include performing an algorithm to reduce the complexity of wiring between the controller and the at least one peripheral device. The plurality of pins may be separated into distinct groups which are arranged in terminal blocks. The algorithm may group connections associated with a particular peripheral device to the same terminal block. Moreover, the algorithm may be an optimization algorithm to reduce the complexity of the connections between the controller and the at least one peripheral device. The optimization algorithm may select the individual pins which reduce connection lengths for each peripheral device.

In another embodiment, subsequent reconfigurations of the control system which introduce additional peripheral devices may avoid the specification of individual pins which are already used in established connections. The specification of individual pins may further include options for not using specific pins for establishing connections.

In another embodiment, the method may execute on an administration device, and further include establishing a connection to the controller, providing the generated instructions to the controller, receiving pin configuration information from the controller, and displaying the created report. The created report may be based on received pin configuration information. In a different embodiment, the report may be displayed prior to the controller having established connections to the individual pins. In another embodiment, the connection to the controller may be established over a network, or alternatively established over a serial connection.

In yet another embodiment, the method may execute on an administration device. The method may further include determining, based on the generated instructions, a pin configuration from the plurality of pins for connecting the controller to the at least one selected peripheral device. The method may further export a file which contains the determined pin configuration. The method may further establish a connection to the controller over a network, and provide the exported file to command a controller to establish connections within the controller based on the determined pin configuration. The exported file may be provided to additional controllers in a peer-to-peer manner.

In another embodiment, the selections may be based on specific types of peripheral devices, or standard data communication protocols used by a class of peripheral devices. The selections may further comprise a number of doors in the operational environment and a number of controllers associated with each door. The report further comprises graphical layouts displaying representations of the pin configuration on the controller, and the associated electrical connections to the wires associated with the peripheral devices. The method may display the created report illustrating the determined pin configuration.

An apparatus for configuring an installation of a control system within an operational environment is also disclosed below. The apparatus may include a processor, and a memory, coupled to the processor. The memory stores software instructions causing the processor to provide options for installing peripheral devices compatible with a controller, and receive selections based on the provided options. The selections may be associated with an operational environment of at least one selected peripheral device. The processor may further generate instructions to command the controller to specify individual pins from a plurality of pins for connecting the controller to the at least one selected peripheral device. The processor may further create a report to describe connections between the specified individual pins associated with the controller and wires associated with the at least one selected peripheral device. In the specification of individual pins from the plurality of pins, the controller may be further commanded to select the individual pins from the plurality of pins, and electrically configure at least one individual pin from the plurality of pins.

In another embodiment, the processor is included within the controller, and the software instructions may further causes processor to determine, based on the generated instructions, a pin configuration for connecting the controller to the at least one selected peripheral device. The processor may further establish connections within the controller to individual pins based on the determined pin configuration, and provide the created report to an administration device. The created report may be based on determined pin configuration.

In another embodiment, determining the pin configuration may further causes the processor to perform an algorithm to reduce the complexity of wiring between the controller and the at least one peripheral device. The plurality of pins may separated into distinct groups which are arranged in terminal blocks. The algorithm may group connections associated with a particular peripheral device to the same terminal block, may further include an optimization algorithm to reduce the complexity of the connections between the controller and the at least one peripheral device. The optimization algorithm may select the individual pins which reduce connection lengths for each peripheral device.

In another embodiment, subsequent reconfigurations of the control system which introduce additional peripheral devices further causes the processor to avoid the specification of individual pins which are already used in established connections. The specification of individual pins may further include options for not using specific pins for establishing connections.

In yet another embodiment, the processor may be included within an administration device, and the software instructions further cause processor to establish a connection to the controller, provide the generated instructions to the controller, receive pin configuration information from the controller, and display the created report. The created report may based on received pin configuration information. In another embodiment, the report may be displayed prior to the controller having established connections to the individual pins. The connection to the controller may be established over a network, or may be established over a serial connection.

In another embodiment, the processor may be included within an administration device, and the software instructions further cause processor to determine, based on the generated instructions, a pin configuration from the plurality of pins for connecting the controller to the at least one selected peripheral device. The processor may further export a file which contains the determined pin configuration.

In another embodiment, the software instructions may further cause the processor to establish a connection to the controller over a network, and provide the exported file to command a controller to establish connections therein based on the determined pin configuration. The exported file may be provided to additional controllers in a peer-to-peer manner.

In yet another embodiment, the selections may be based on specific types of peripheral devices, or standard data communication protocols used by a class of peripheral devices. The selections may further comprise a number of doors in the operational environment and a number of controllers associated with each door.

In another embodiment, the report further may further include graphical layouts displaying representations of the pin configuration on the controller, and the associated electrical connections to the wires associated with the peripheral devices. The processor may prepare the report to display the determined pin configuration.

BRIEF DESCRIPTION OF THE DRAWINGS

FIGS. 7A and 7B are exemplary user interfaces which provide options for configuring a control system and selecting peripheral device(s) associated with an operational environment;

DETAILED DESCRIPTION

Figure 1:
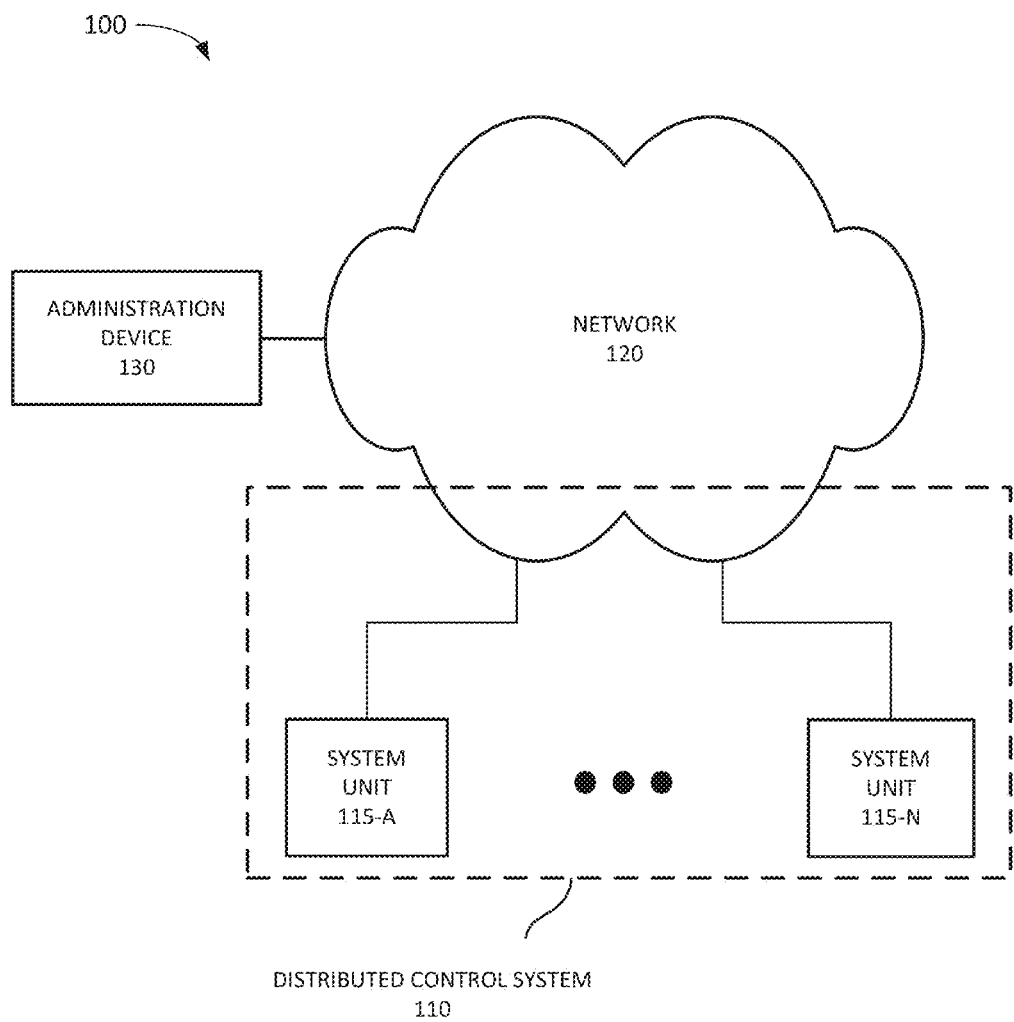
FIG. 1 is a block diagram illustrating an exemplary environment according to an embodiment described herein.

The following detailed description refers to the accompanying drawings. The same reference numbers in different drawings may identify the same or similar elements.

Given the large variety of different peripheral devices which can be used within a control system, installation and configuration of the system can become complex, and may even present challenges for experienced installers.

Embodiments described below may ease the above-noted complexity. These embodiments relate generally to processes and systems that can assist in the installation and configuring of a control system in an operational environment. In one embodiment, a configuration assistant, or "wizard," can guide the user by collecting information regarding one or more peripheral device which have been selected for use by the control system in a particular environment. The configuration assistant may be implemented in software, and can run on a controller of the control system. Alternatively, the configuration assistant may run on a separate processor which may be electrically coupled to the control system during the configuration process. In other embodiments, the configuration assistant may execute on a separate processor "offline," and can generate files which may be used later for configuring for one or more control systems having similar operational environments.

To make it user-friendly process, the collected information may be gathered step-by-step from the user, as options for subsequent selections may depend on prior selections. Further information may be obtained as to how the peripheral devices are implemented in their environment and/or their electrical characteristics. After the last portion of information regarding the peripheral device(s) is entered, the user may indicate the selection process is complete. The configuration assistant may then generate instructions which may be used to produce a pin configuration for the actual configuration of the controller. In one embodiment, the instructions may be provided to the controller for generation of the pin configuration. In another embodiment, the configuration assistant may determine the pin configuration for the selected peripheral devices providing instructions the controller. The pin configuration process determines I/O pin connector assignments residing on the circuit board of the controller. The controller can internally configure itself to select the appropriate pins on its circuit board for each selected peripheral device. Based on the pin configuration, the controller will have assigned each pin to correspond to each appropriate wire on the selected peripheral device(s). This configuration may further include setting the appropriate protocols and/or electrical characteristics of each pin, so that the connections are compatible with each selected peripheral device.

Once the information for the pin configuration is established, the configuration assistant may generate a report that can be used to guide the installer in physically connecting each peripheral device to a controller. The report may include a graphical presentation of the layout of the controller's circuit board, which can be thought of as a map of how the wires from each selected peripheral device will be connected to the pins of the circuit board.

Embodiments described here may be applicable to any type of control system and operational environment. For example, the configuration assistant may be used in a very simple control system having only a single controller and peripheral device. Such applications may be useful for residential environments, where the installer may be a home owner with limited installation experience. In other applications, the configuration assistant may ease the installation of a sophisticated distributed control system having multiple interacting controllers. In this type of application, the installer may be an experienced professional challenged by a complex configuration of peripheral devices operating in a mission-critical environment. Regardless of the complexity of the control system and/or its operational environment, the configuration assistant may ease its installation and/or reconfiguration, and thus reduce installation times and improve operational reliability.

FIG. 1 is a block diagram of an exemplary environment 100 in which can be installed and configured based on the systems and methods described below. As shown in FIG. 1, environment 100 may include a distributed control system 110 (e.g., a distributed physical access control system), a network 120, and an administration device 130.

Distributed control system 110 may include a distributed computing system that includes system units 115-A to 115-N (referred to collectively as "system units 115" or "units 115," and individually as "unit 115"). In one embodiment, system unit 115 includes a physical access control device. For example, system unit 115 may include a controller that controls access to a secure area, such as a room or a group of rooms. System unit 115 may receive credentials (e.g., access card credentials) via a reader device and to determine whether the credentials are authentic and are associated with authority to access the secure area. If so, the controller may issue a command to open a lock on a door or perform other operations associated with granting access to the secure area. Other examples may include access to control various devices in an operational environment, such as, for example, starting a fan, initiating an alarm in a building management system, activate a robot in an industrial automation system, etc.

Distributed control system 110 may include one or more distributed datasets. A distributed dataset includes data that is stored in a distributed (and potentially redundant) fashion in system units 115 that are associated with the distributed dataset. In one embodiment, distributed datasets are replicated on more than one device. For example, the entire distributed dataset may be stored in all the units 115. In another embodiment, one or more units 115 may store a subset of the distributed dataset. Also, a distributed dataset may be associated with all system units 115 or may be associated with a subset of system units 115. In an embodiment, a distributed data set includes the configuration files generated by the configuration assistant in offline mode, which are described in more detail with respect to FIG. 12.

In one embodiment, consensus is reached among units 115 in order for a change to be made in the distributed dataset (e.g., a consensus-based distributed database). System unit 115 may propose a change to a consensus-based distributed dataset. If the change is accepted by a quorum of units 115 associated with the distributed dataset, a consensus may be reached and the change may be propagated to each local copy of the distributed dataset in each associated unit 115. Thus, a consensus with respect to a change in the distributed dataset may be reached if a quorum of the associated units 115 votes for the change A quorum may correspond to the smallest majority of the associated units 115. Thus, if a distributed dataset is associated with N units 115, a quorum may be reached if N/2+1 associated units 115 votes for the change if N is an even number, or if (N−1)/2+1 associated units 115 votes for the change if N is an odd number. Requiring a smallest majority to reach a quorum may ensure that when considering two conflicting proposals, at least one system unit 115 receives both proposals and selects one of the proposals for consensus.

A consensus-based distributed dataset may ensure that any system unit 115 associated with the distributed dataset includes the information (e.g., all the information in one embodiment) managed by the distributed dataset. For example, a distributed dataset may include access rules and the access rules may be available to any system unit 115 associated with the distributed dataset. Thus, as a result of the one or more distributed datasets, in one embodiment, control system 110 may correspond to a decentralized system with no central controlling device, such as a server device. In other embodiments, control system 110 may include both a decentralized system and a central controlling device (such as a server device). Changes to control system 110 may be configured at any system unit 115 and if the change is associated with a distributed dataset, the change may be propagated to other system units 115 associated with the distributed dataset. Furthermore, control system 110 may exhibit robustness with respect to device failure, as a single point of failure may be avoided. For example, if a particular system unit 115 fails, the other units 115 may continue to operate without loss of data (or with the minimization of loss of data). In another embodiment, a change may be made to the distributed dataset without consensus.

Network 120 may enable units 115 to communicate with each other and/or may enable administration device 130 to communicate with particular units 115. Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

Administration device 130 allows an administrator to connect to a particular unit 115 in order to configure control system 110, change a configuration of control system 110, receive information from control system 110, and/or otherwise administer control system 110. For example, the configuration assistant may run on the administration device for installing and configuring the control system 110 in its chosen environment. Administration device 130 may include any device configured for communicating with one or more of units 115. For example, administration device 130 may include a portable communication device (e.g., a mobile phone, a smart phone, a phablet device, a global positioning system (GPS) device, and/or another type of wireless device); a personal computer or workstation; a server device; a laptop, tablet, or another type of portable computer; and/or any type of device with communication capability. In one embodiment, administration device 130 may be part of unit 115. As such, an administrator may administer control system 110 from one or more of units 115.

Although FIG. 1 shows exemplary components of environment 100, in other implementations, environment 100 may include fewer components, different components, differently arranged components, or additional components than depicted in FIG. 1. Additionally or alternatively, any one device in environment 100 (or any group of devices) may perform functions described as performed by one or more other devices in environment 100.

Figure 2A:
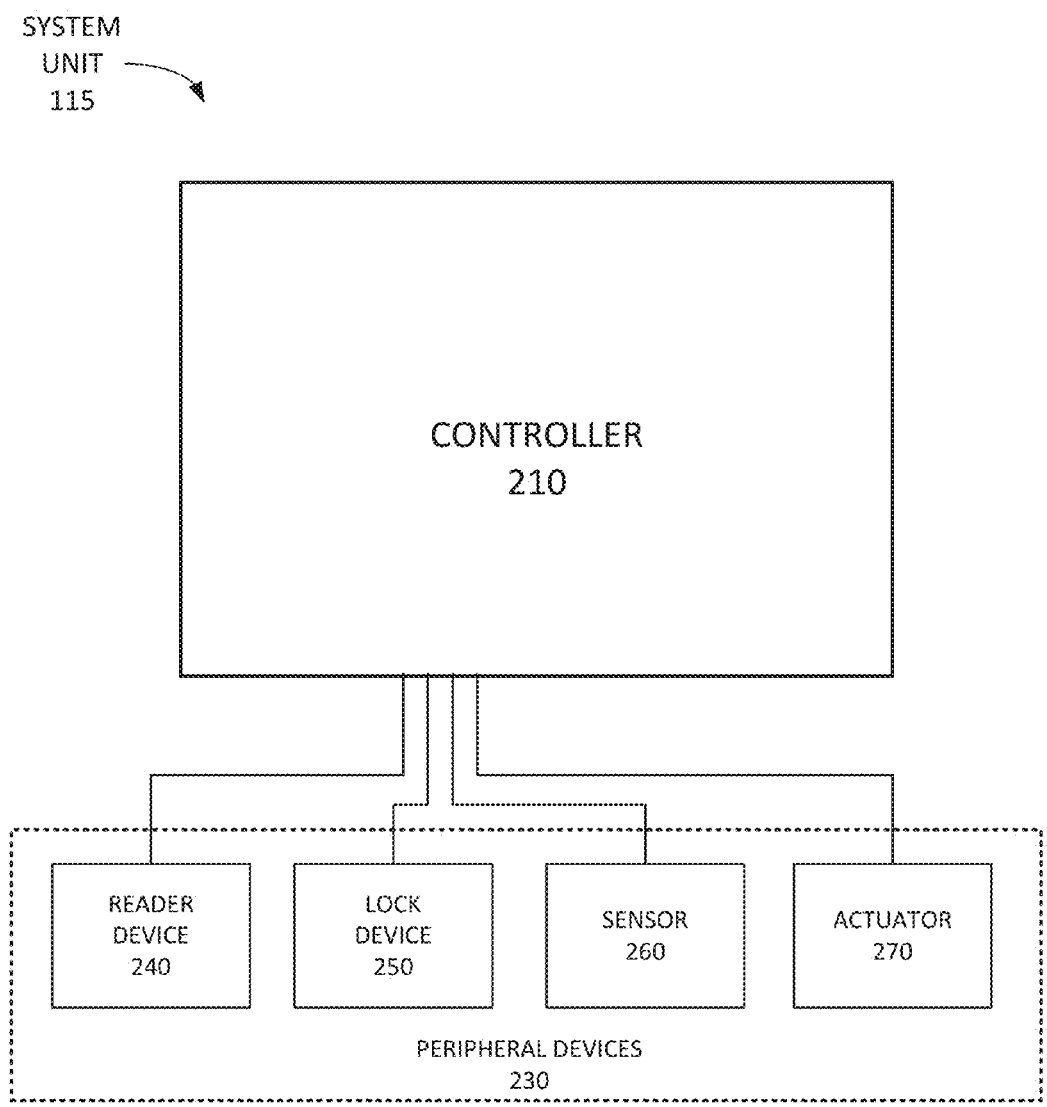
FIGS. 2A and 2B are block diagrams illustrating exemplary components of the system unit of FIG. 1.
Figure 2B:
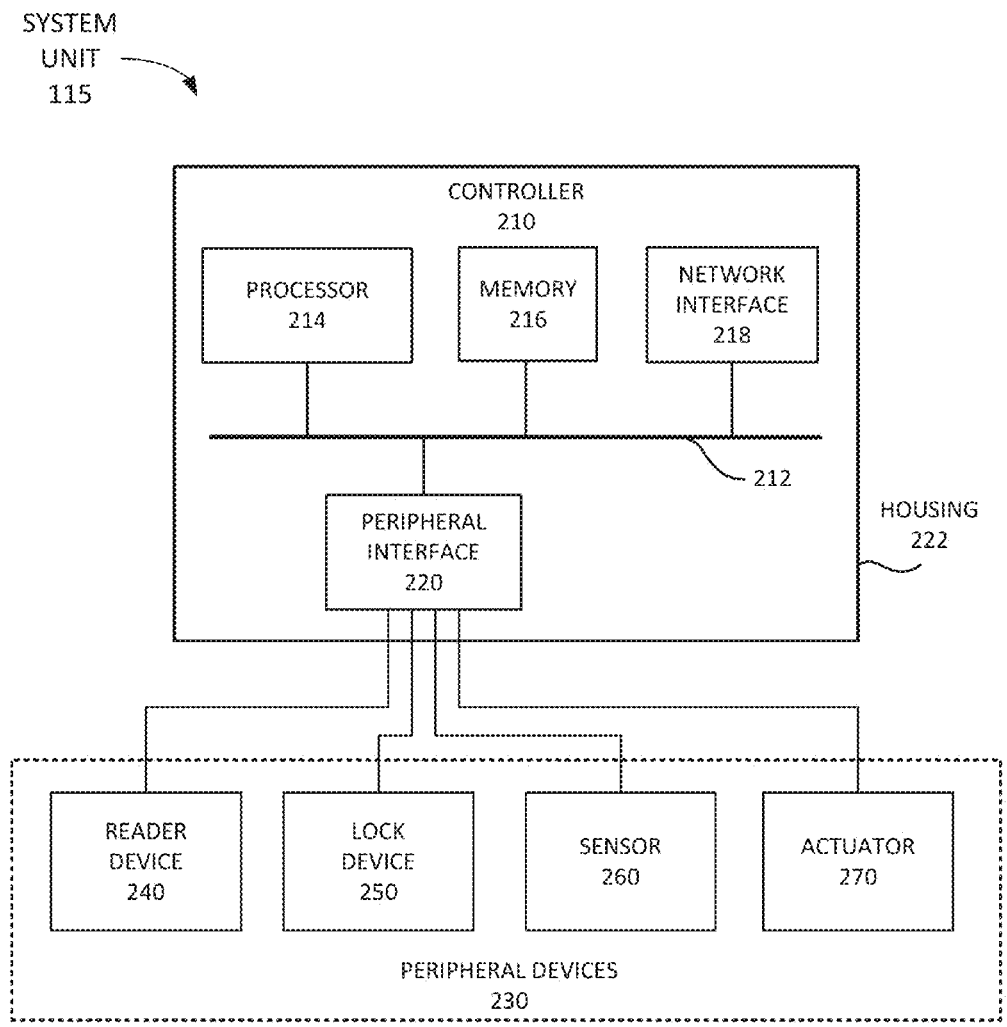

FIGS. 2A and 2B are block diagrams illustrating exemplary components of a unit 115. As shown in FIG. 2A, unit 115 may include a controller 210 and one or more peripheral devices 230. Controller 210 may control the operation of unit 115, may communicate with other units 115, may communicate with administration device 130, and/or may control peripheral devices 230. Peripheral devices 230 may include devices that provide information to controller 210, that are controlled by controller 210, and/or that otherwise communicate with controller 210. In one embodiment, peripheral devices 230 may include any type of security device. For example, peripheral devices 230 may include security devices such as a reader device 240, a lock device 250, a sensor 260 (e.g., a camera), and/or an actuator 270. A peripheral device may include any type security device that can provide credentials, and may further include combinations of the types of peripheral devices listed above. For example, a reader can be any type of device providing credentials, and may use one or more sensors, such as, a camera and/or microphone, to accomplish its task.

As shown in FIG. 2B, controller 210 may include a bus 212, a processor 214, a memory 216, a network interface 218, a peripheral interface 220, and a housing 222. Bus 212 includes a path that permits communication among the components of controller 210. Processor 214 may include any type of single-core processor, multi-core processor, microprocessor, latch-based processor, and/or processing logic (or families of processors, microprocessors, and/or processing logics) that interprets and executes instructions. In other embodiments, processor 214 may include an application-specific integrated circuit (ASIC), a field-programmable gate array (FPGA), and/or another type of integrated circuit or processing logic.

Memory 216 stores information, data, and/or instructions. Memory 216 may include any type of dynamic, volatile, and/or non-volatile storage device. Memory 216 may store instructions, for execution by processor 214, or information for use by processor 214. For example, memory 216 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory. In an embodiment, memory 216 may also store configuration information for any number of peripheral devices which are compatible with system unit 115.

Network interface 218 may include a transceiver (e.g., a transmitter and/or a receiver) that enables controller 210 to communicate (e.g., transmit and/or receive data) with other devices and/or systems via wired communication links (e.g., conductive wire, twisted pair cable, coaxial cable, transmission line, fiber optic cable, and/or waveguide, etc.), wireless communication links (e.g., radiofrequency, infrared, and/or visual optics, etc.), or a combination of wireless and wired communication links. Network interface 218 may include a transmitter that converts baseband signals to radiofrequency (RF) signals and/or a receiver that converts RF signals to baseband signals. Network interface 218 may be coupled to an antenna for transmitting and receiving RF signals.

Network interface 218 may include a logical component that includes input and/or output ports, input and/or output systems, and/or other input and output components that facilitate the transmission of data to other devices. For example, network interface 218 may include a network interface card (e.g., Ethernet card) for wired communications and/or a wireless network interface (e.g., a WiFi) card for wireless communications. Network interface 218 may also include a universal serial bus (USB) port for communications over a cable, a Bluetooth wireless interface, a radiofrequency identification (RFID) interface, a near-field communications (NFC) wireless interface, and/or any other type of interface that converts data from one form to another form.

Peripheral interface 220 may be configured to communicate with one or more peripheral devices 230. For example, peripheral interface 220 may include one or more logical components that include input and/or output ports, input and/or output systems, and/or other input and output components that facilitate the transmission of data to peripheral devices 230. As an example, peripheral interface 220 may communicate with peripheral devices 230 using a Serial Peripheral Interface Bus protocol (e.g., the Wiegand protocol, and/or the RS-485 protocol). As another example, peripheral interface 220 may use a different type of protocol. In one embodiment, network interface 218 may also act as a peripheral interface for coupling peripherals 230 to controller 210.

Housing 222 may enclose the components of controller 210 and may protect the components of controller 210 from the environment. In one embodiment, housing 222 may include one or more of peripheral devices 230. In another embodiment, housing 222 may include administration device 130. Housing 222 may define the boundaries of one system unit 115 and/or controller 210 from other system units 115 and/or controllers 210 in a system with multiple system units 115 and/or controllers 210 system.

As described below, controller 210 may perform operations relating to the installation and configuration of the system unit 115 in an operational environment. Controller 210 may perform these operations as a result of hardwired circuitry of an ASIC. Controller 210 may also (or alternatively) perform these operations in response to processor 214 executing software instructions contained in a computer-readable medium, such as memory 216. A computer-readable medium may include a non-transitory memory device. Memory 216 may be implemented within a single physical memory device or spread across multiple physical memory devices. The software instructions may be read into memory 216 from another computer-readable medium or from another device. The software instructions contained in memory 216 may cause processor 214 to perform processes described herein. Thus, implementations described herein are not limited to any specific combination of hardware circuitry and software.

Returning to peripheral devices 230, reader device 240 may include a device that reads credentials from a user and provides the credentials to controller 210. For example, reader device 240 may include a keypad or keyboard configured to receive an alphanumeric personal identification number (PIN) from a user; a card reader configured to read a card that stores a card code on a magnetic strip or another type of storage device, such as a tag; a fingerprint reader configured to read a user's fingerprint; an iris reader configured to read a user's iris; a microphone and a voice signature identifier configured to record a user's voice signature; an NFC reader; and/or another type of reader device. Reader device 240 may include any type security device that can provide credentials, and may include one or more sensor devices, such any sensor device described below with reference to sensor 260. For example, reader device 240 may include a camera used for facial recognition and/or a microphone used for voice recognition. In these cases, for example, a user's voice and/or face may be used as a user credential.

Lock device 250 may include a lock controlled by controller 210. Lock device 250 may lock a door (e.g., prevent it from opening or closing), a window, an HVAC vent, and/or another type of access opening to a secure area. For example, lock device 250 may include an electromagnetic lock; a mechanical lock with a motor controlled by controller 210; an electromechanical lock; and/or another type of lock.

Sensor 260 may include a sensing device. As examples, sensor 260 may include a door sensor to sense whether a door is open or closed; a visible light monitoring device (e.g., a camera), an infrared (IR) light monitoring device, a heat signature monitoring device, an audio monitoring device (e.g., a microphone), and/or another type of monitoring device; an alarm sensor, such as a motion sensor, a heat sensor, a pressure sensor, and/or another type of alarm sensor; a tamper sensor, such as a position sensor located inside unit 115; and/or a "request to exit" button located within a secured area associated with unit 115; and/or another type of sensor device. In the examples below, sensor 260 may be referred to as "camera 260."

Actuator 270 may include an actuator device. As an example, actuator 270 may control an illumination device. As other examples, actuator 270 may include a burglar alarm activator; a speaker to play messages or generate alarm signals; a display device; a motor to move sensor 260 (e.g., control the field of view of a camera or other monitoring device); a motor for opening/closing a door, window, HVAC vent, and/or another opening associated with a secure area; a motor to secure lock device 250 in a locked or unlocked position; a fire extinguishing device; and/or another type of actuator device.

Although FIGS. 2A and 2B show exemplary components of unit 115, in other implementations, unit 115 may include fewer components, different components, additional components, or differently arranged components than depicted in FIGS. 2A and 2B. For example, although a single reader device 240, a single lock device 250, a single sensor 260, and a single actuator 270 are shown in FIG. 2A, in practice, peripheral devices 230 may include multiple reader devices 240, multiple lock devices 250, multiple sensors 260, and/or multiple actuators 270. Peripheral devices 230 may also not include one or more of the devices shown in FIG. 2A. Additionally or alternatively, peripheral devices 230 may include any other type of security device not shown in FIG. 2A or 2B. Additionally or alternatively, any component of unit 115 (or any group of components) may perform the task or tasks described as performed by one or more other components of unit 115.

Further, although exemplary distributed control system 110 includes a physical access distributed control system, other implementations may control systems other than physical access. On the other hand, distributed control system 110 may include any type of physical access control systems (e.g., in an operational environment), such as a control system for opening and/or closing a door or controlling physical access to a building or facility. Distributed control system 110 may also include a system to control a fan (e.g., start or stop), to initiate an alarm in a building management system (e.g., failed authentication, successful authentication, etc.), or to control a robot arm in an industrial automation system.

Figure 3:
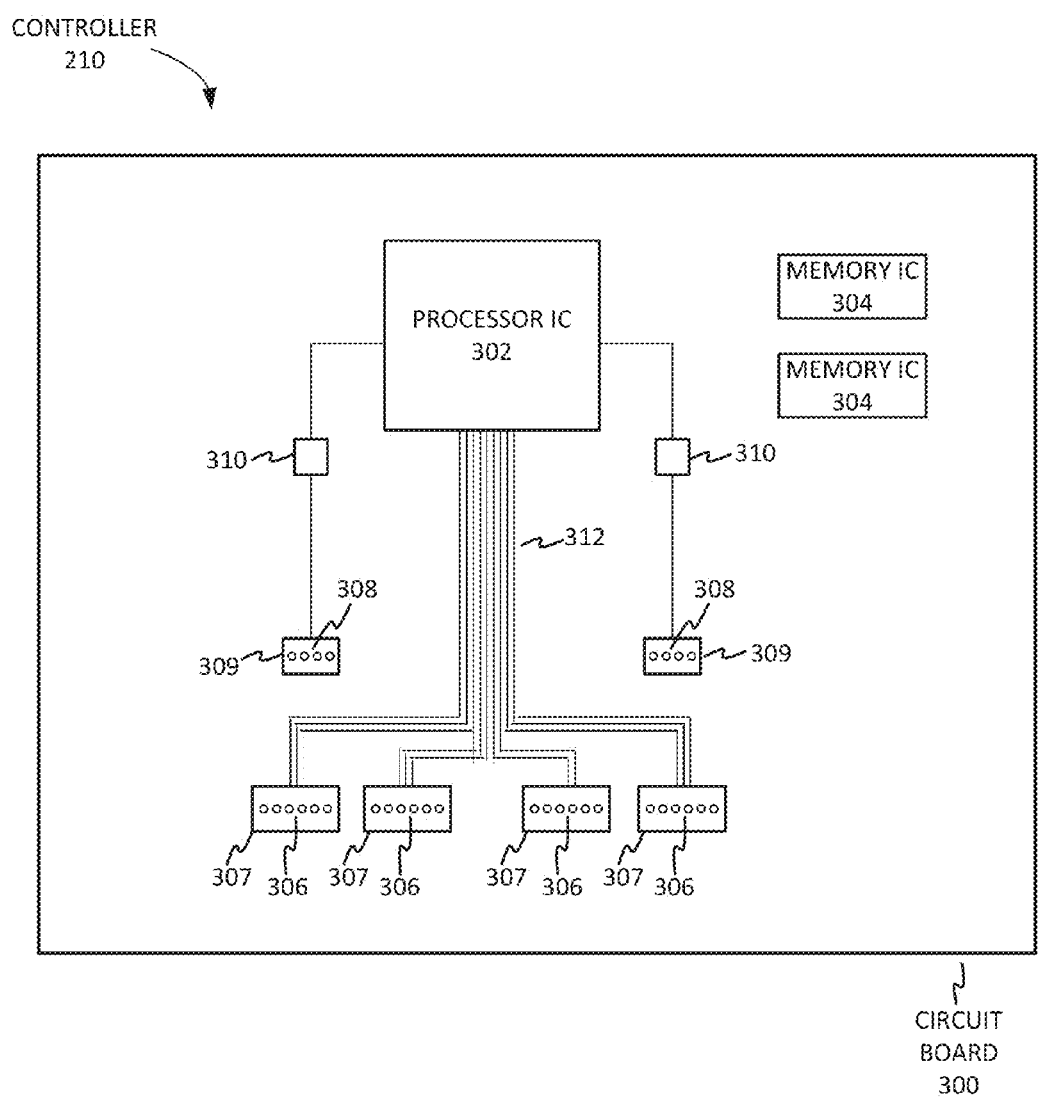
FIG. 3 is block diagram illustrating an exemplary layout of a components within a controller of FIG. 2.

FIG. 3 is block diagram illustrating an exemplary layout of various components within the controller 210 shown in FIGS. 2A and 2B. The components may include a processor IC 302, one or more memory ICs 304, a first group of pins 306, a second group of pins 308, a first group of terminal blocks 307, a second group of terminal blocks 309, and one or more relays 310. These components may be physically secured and/or electrically interconnected using circuit board 300. Additional electrical components and/or connections may be present on the circuit board 300 of controller 210, but have not been shown nor described here for the sake of brevity.

In one embodiment, processor IC 302 may be configured to establish direct electrical connections to one or more pins in first group of pins 306. These direct electrical connections may be realized over electrical traces 312 and by a switching facility (not shown) located within processor IC 302. This switching facility may be embodied, for example, by a crossbar switch. Processor IC 302 may also control second group of pins 308 using one or more relays 310. Direct electrical connections to the circuitry within processor IC 302 are typically not established with second group of pins 308, since the currents carried by these pins may exceed the limits of processor IC 302. Processor IC 302 may also be coupled to one or more memory ICs 304 to access instructions and/or data. In alternative embodiments, a physically separate memory controller (not shown) may serve as an interface between processor IC 302 and memory IC 304.

Based on the information provided by the user (described in more detail below in reference to FIGS. 7A and 7B), the configuration assistant may generate instructions causing processor IC 302 to create a pin configuration. In an embodiment, the pin configuration assigns individual pins on the circuit board 300 to appropriate wires connected the selected peripheral devices. For example, the pin configuration can specify individual pins from first group of pins 306 for each selected peripheral device. Specifying individual pins may include the actual selection of individual pins for a particular peripheral device. As explained in more detail below, the selection of particular pins on circuit board 300 may be motivated by reducing the complexity of the wiring for the installer. Specifying individual pins may further include defining the electrical configuration of the signals associated with the selected pins The electrical configuration may include particular protocol(s) compatible with a selected peripheral device, and/or various electrical characteristics which may be user-selectable. User selectable electrical characteristics may include, for example, signal polarities, voltage levels, etc., and may be associated with a particular operating environment.

Processor IC 302 can configure itself internally to provide the appropriate connections to the pins as specified in the pin configuration. For example, given a particular selected peripheral device, processor IC 302 selects one or more individual pins from first group of pins 306, and also defines the pin's electrical configuration. The configuration of processor IC 302 may be performed, for example, by an internal crossbar switch.

In an embodiment, the instructions generated by the configuration assistant can include calls to an Application Programming Interface (API) for accessing available resources within processor IC 302 that facilitate the configuration of system unit 115. Moreover, processor 302 may use a data store containing specifications of devices compatible with system unit 115 to assist in the creation of the pin configuration. The data store may be stored onboard controller 210 in one or more memory ICs 304. In other embodiments, at least a portion of the data store may be stored remotely and accessed over the network by processor IC 302.

Based on the pin configuration, the configuration assistant may create a report to describe the connections between individual pins on circuit board 300 and wires of each selected peripheral device. This report permits the installer to physically connect each device by indicating the location of the appropriate pin on the circuit board 300 for each wire connected to the selected peripheral device. The report is further described below in the discussion of FIG. 8.

First group of pins 306 and second group of pins 308 may further be associated with structures to facilitate the connection of each of the individual pins with the corresponding wires of peripheral devices 230. For example, one such structure is a terminal block, which are modular insulated blocks that secure two or more wires together. Terminal blocks provide a convenient means of connecting individual pins to wires, and further organizing these connections into identifiable groups. Referring to FIG. 3, terminal blocks 307 may be associated with first group of pins 306. Terminal blocks 309 may be associated with second group of pins 308. Each terminal block may group a subset of the plurality of pins together, helping to organize the wiring of the peripheral devices 230 to circuit board 300. In some embodiments, terminal blocks may include a lower section fixed to the circuit board, and an upper section which may be removably attached into the lower section of the terminal block. After the individual wires have been connected to the upper section, the upper section may be plugged into the lower section similar to a connector. These types of terminal blocks can provide the ability to quickly engage and disengage an entire subgroup of pins, similar to a standard connector. However, with the terminal block, the connections to the individual pins are first established using individual wires by the installer prior to the terminal block being used as a connector.

The term "pin" refers to an individual conductor attached to circuit board 300 which may be used by an installer to establish an electrical connection. A pin may also refer to the individual connectors within a terminal block fixedly mounted on circuit board 300. A pin provides a single electrical connection for signal, power, or ground. A pin is distinguished from a connector in that the pin only establishes one electrically-conducting physical connection. A connector, however, establishes at least two physical connections which are electrically conducting. For example, a standard 3.5 mm phone connector, commonly used in audio applications for use with an "audio jack," has at least two separate physical connections for establishing both a signal connection and a ground connection upon insertion of the phone connector into the audio jack.

Processor IC 302 represents an exemplary realization of processor 214, and thus it may be take the form of any type of microprocessor, controller, ASIC, FPGA, any other suitable integrated circuit, or any combination thereof. Memory ICs 304 may store software instructions for running the configuration assistant and/or instructions for creating pin configurations. Instructions for determining pin configurations may include API libraries and/or optimization algorithms for simplifying and improving connection placement. Memory ICs 304 may further store specification data for all the peripheral devices 230 which are compatible with controller 210.

Figure 4:
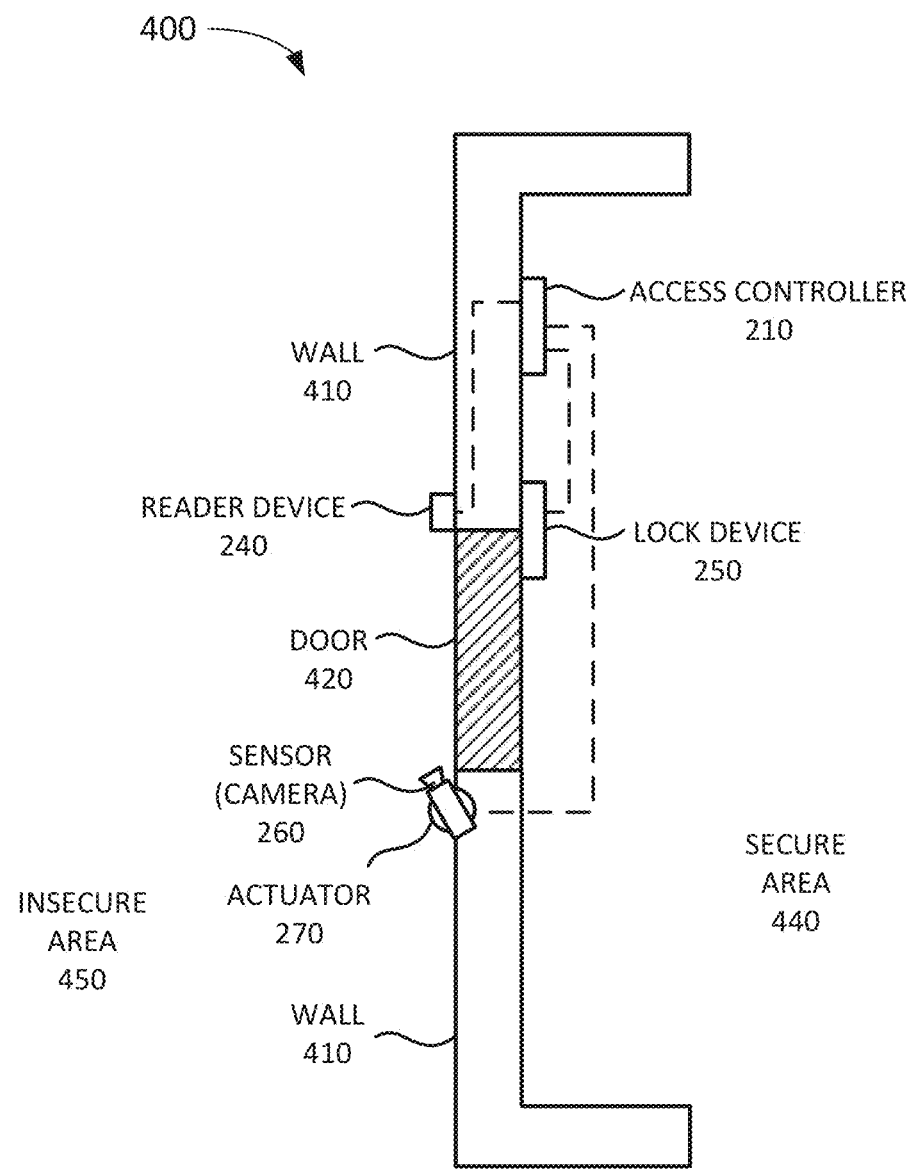
FIG. 4 is a floor plan illustrating an exemplary physical layout of the system unit of FIG. 1 in one embodiment.

FIG. 4 is a floor plan diagram illustrating an exemplary physical layout 400 of unit 115. As shown in FIG. 4, physical layout 400 may include a wall 410, a door 420, controller 210, reader device 240, lock device 250, sensor 260, and actuator 270.

Wall 410 encloses a secure area 440, such as a room in a building. Door 420 provides access for a user to secure area 440. In this embodiment, controller 210 is installed inside secure area 440. In other embodiments, controller 210 may be installed in an insecure area 450. Reader device 240 is installed outside secure area 440 and lock device 250 is installed inside secure area 440 to wall 410 and door 420. Sensor 260, in this example, is a monitoring device mounted outside secure area 440 in insecure area 450. Actuator 270 includes a motor used to control the field of view of the monitoring device in this example.

When a user enters credentials into reader device 240 (e.g., by entering a PIN, scanning an access card, scanning an iris, etc.), controller 210 may use the credentials to authenticate the identity of the user and may perform a lookup in an access rules table to determine whether to grant access to the user based on the identity of the user and the access rules. If controller 210 determines that access should be granted, controller 210 activates lock device 250 to unlock door 420, thus granting access to the user to secure area 440.

Although FIG. 4 shows exemplary components of physical layout 400, in other implementations, physical layout 400 may include fewer components, different components, additional components, or differently arranged components than depicted in FIG. 4. Additionally or alternatively, any one component (or group of components) in physical layout 400 may perform a task or tasks described as performed by one or more other components of physical layout 400.

Figure 5:
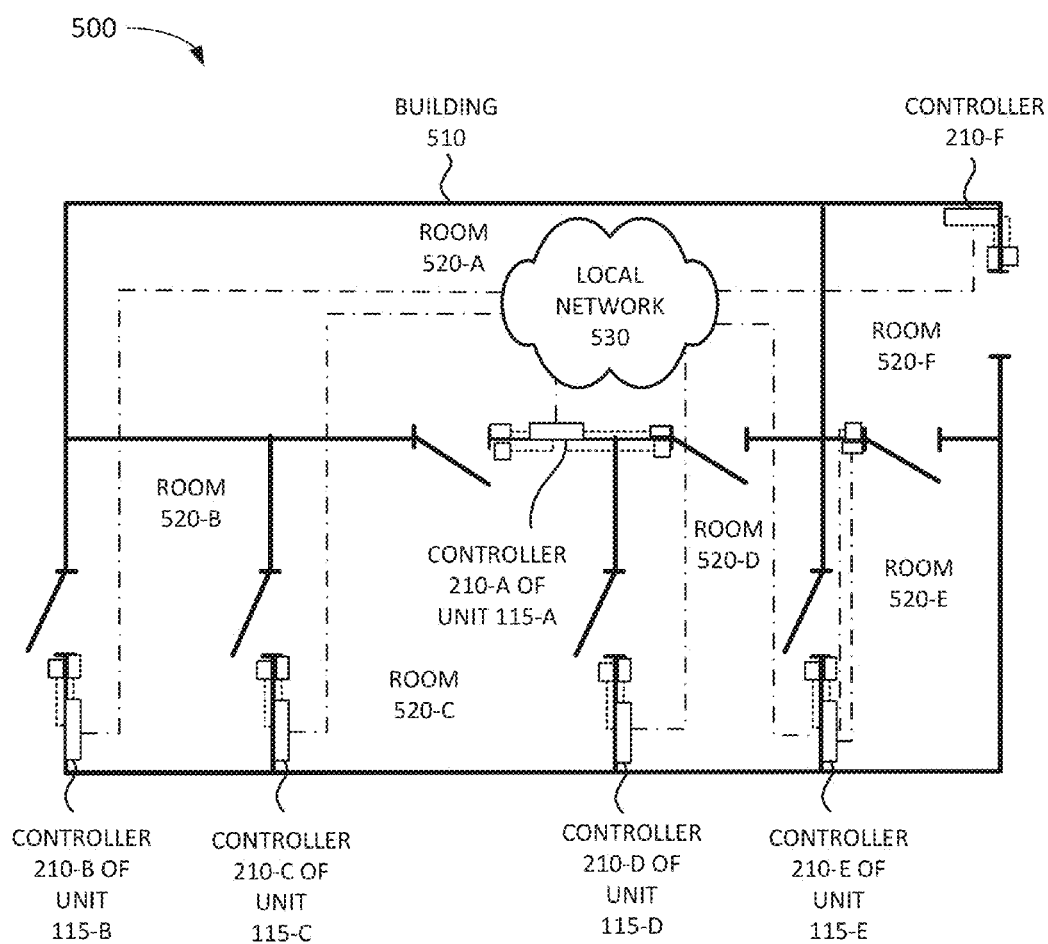
FIG. 5 is a floor plan diagram illustrating an exemplary physical layout of the distributed control system of FIG. 1.

FIG. 5 is a floor plan diagram illustrating an exemplary physical layout 500 of control system 110. As shown in FIG. 5, physical layout 500 may include a building 510 with rooms 520-A through 520-F. A local network 530, such as an Ethernet network, may interconnect system units 115-A through 115-F. In this example, system unit 115-A controls two doors into room 520-A; system unit 115-B controls an outside door into room 520-B; system unit 115-C controls one door from room 520-B to room 520-C, system unit 115-D controls one door from room 520-C to room 520-D; system unit 115-E controls one door from room 520-D to room 520-E; and unit 520-F controls an outside door into room 520-F.

In this example, system units 115-A to 115-F do not include a central controlling device (e.g., a server) and may include one or more distributed datasets. For example, system units 115-A through 115-F may maintain a distributed credentials table, a distributed access rules table, and/or a distributed events log. Assume an administrator uses administration device 130 to log into system unit 115-A to add a user and to add credentials associated with a user. Those added credentials may be distributed to the other system units 115 that control doors to rooms to which the user has access. If system unit 115-B fails, for example, data collected by system unit 115-B may continue to be available as a result of a distributed events log included in the other system units.

In FIG. 5, each unit 115 is associated with a controller 210. Further, in the implementation of FIG. 5, each controller 210 is in a different location (e.g., different room 520) than other controllers 210. In other implementations, some controllers 210 and units 115 may be located in different buildings, different geographic regions, different nations, different continents, etc., than other controllers and units 115. Despite their diverse locations, in one embodiment, units 115 and controllers 210 may be able to discover each other (or make a best effort to do so), form a peer-to-peer network, and distribute datasets.

Although FIG. 5 shows exemplary components of physical layout 500, in other implementations, physical layout 500 may include fewer components, different components, additional components, or differently arranged components than depicted in FIG. 5. For example, in another embodiment, a central controlling device (e.g., a server) may be used in conjunction with one or more distributed datasets. Additionally or alternatively, one or more components of physical layout 500 may perform one or more tasks described as performed by one or more other components of physical layout 500.

Figure 6:
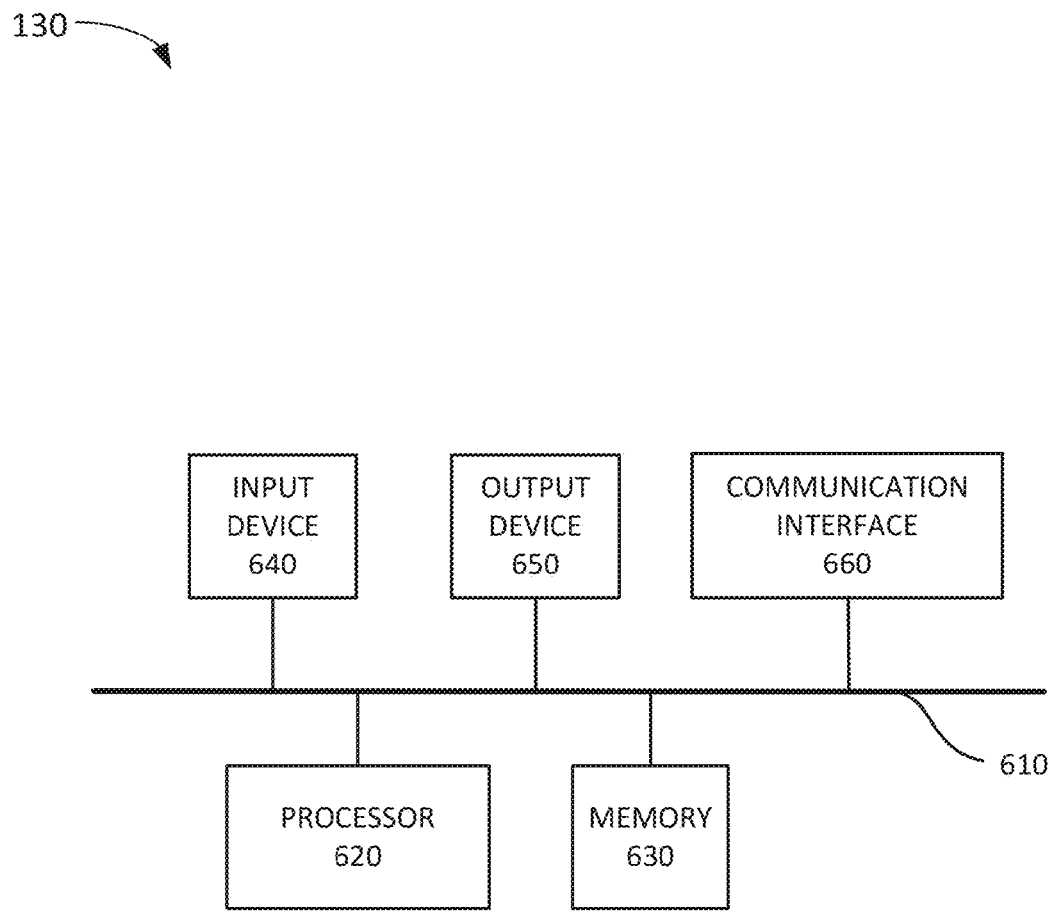
FIG. 6 is a block diagram illustrating exemplary components of the administration device of FIG. 1.

FIG. 6 is a block diagram illustrating exemplary components of administration device 130 which may run the configuration assistant. As shown in FIG. 6, administration device 130 may include a bus 610, a processor 620, a memory 630, an input device 640, an output device 650, and a communication interface 660.

Bus 610 includes path that permits communication among the components of administration device 130. Processor 620 may include any type of single-core processor, multi-core processor, microprocessor, latch-based processor, and/or processing logic (or families of processors, microprocessors, and/or processing logics) that interprets and executes instructions. In other embodiments, processor 620 may include an ASIC, an FPGA, and/or another type of integrated circuit or processing logic.

Memory 630 stores information, data, and/or instructions which include code for the configuration assistant. Memory 630 may include a dynamic, volatile, and/or non-volatile storage device. Memory 630 may store instructions, for execution by processor 620, or information, such as, for example, parameters, for use by processor 620. For example, memory 620 may include a RAM, a ROM, a CAM, a magnetic and/or optical recording memory device, etc.

Input device 640 allows an operator to input information into administration device 130, which may include performing sections for peripheral devices 230. Input device 640 may include, for example, a keyboard, a mouse, a pen, a microphone, a touch-screen display, etc. Output device 650 may output information to an operator of administration device 130. Output device 650 may include a display, a printer, a speaker, and/or another type of output device, which may be used to provide the report to the user which describes connections between the controller 210 and the peripheral devices 230.

Communication interface 660 may include (e.g., a transmitter and/or a receiver) that enables controller 210 to communicate (e.g., transmit and/or receive data) with other devices and/or systems via wired communication links, wireless communication links, or a combination of wireless and wired communication links. Communication interface 660 may include a network interface card (e.g., Ethernet card) for wired communications and/or a wireless network interface (e.g., a WiFi) card for wireless communications.

Administration device 130 may perform operations relating to managing units 115 in system 110. Administration device 130 may perform these operations in response to processor 620 executing software instructions contained in a computer-readable medium, such as memory 630. The software instructions contained in memory 630 may cause processor 620 to perform these operations.

FIGS. 7A and 7B are exemplary user interfaces which provide options for configuring system unit 115 and selecting peripheral device(s) within their operational environment. The configuration assistant generates the user interfaces, which in one embodiment are implemented as a web-based GUI. The generated user interfaces may be displayed on the administration device 130.

FIG. 7A shows an exemplary screen for configuring a system having a door lock and reader for a single door. The screen may include a plurality of windows (702, 704) having various options for entering information about the system unit 115 and its operational environment. The user may encounter window 702 initially, which can accept inputs for the name of controller 210 and the number of peripheral devices to be used in system unit 115. Once the number of peripheral devices are known, additional fields may be provided to enter the name of each peripheral device. Data entry is complete for window 702, for example, once the user selects the "Next" button, where window 704 may be provided to gather more specific information about the peripheral device given the name "Hardware Lab Door Lock." Window 704 may collect more detailed information regarding the first named peripheral device. In this example, this is a door lock named "Hardware Lab Door Lock." The user may, from a pull down menu, indicate the general type of peripheral device from a fixed selection of devices (e.g., door lock, reader, sensor, actuator, etc.), from which "door lock" is selected. Subsequent graphical controls may be presented to indicate the type of door lock and the number of doors. In this example, a "dual lock" is selected from a pull down menu presenting the types of locks which are appropriate for the system. An additional pull down is presented to enter the number of doors to be secured by the door lock. After the number of locks is known, additional graphical controls may be presented for each lock in window 704. For example, the electrical specification for "Lock 1" may be specified using a radio dial button, indicating "Lock 1" operates at 12 volts, and a pull-down menu indicating how the polarity of the lock's signal affects the state of "Lock 1" (e.g., ground corresponds to a locked state, and 12 volts corresponds to an unlocked state). Further down in window 704, similar information may be entered for "Lock 2." Here, "Lock 2" may be specified as working in conjunction with a relay. A pull-down menu may configure "Lock 2" to be in the locked state when relay is open, and be in the unlocked state when the relay is closed. Once the user is satisfied with the selections made in window 704, the "Next"

button may be activated to proceed with the selection process, which provides another window shown in FIG. 7B.

FIG. 7B shows an exemplary screen for configuring the peripheral device named "Hardware Lab Reader." Window 706 may initially display a pull-down menu to specify the general type of peripheral device. In this example, the user activates a pull-down menu and selects "Reader" as the type of device. Upon making this selection, subsequent graphic controls may be displayed which are specifically tailored to collecting information about readers. For example, a pull-down menu may be presented to designate that the reader is a "Card" reader. This selection can cause subsequent graphical controls to be presented to collect additional information, some of which may be specific to card readers. Further referring to window 706, parameters specific entering an area may be solicited by the configuration assistant. Here, a box may be checked to indicate that the reader is used on entry. Further selections regarding the entering protocol being used can be made using a radio dial button labeled "RS485 full duplex." An additional pull-down menu may further specify the RS485 protocol as using "HADP." Pull-down menu items which are made irrelevant based on prior selections may be displayed in gray, such as the menus labeled "OSDP." The configuration assistant may further solicit additional parameters regarding an exit reader, where the user selects further selects the "Wiegand" protocol using the appropriate radio dial button. Finally, the user may select the option "Request to Exit" (REX) for the card reader, along with this reader connection being designated as "active high" by a radio dial button.

Once the configuration assistant collects all of the information regarding system unit 115 and its operating environment, information may be generated to create a pin configuration, and a report may be provided to assist the user (installer) to connect controller 210 to the selected peripheral devices. An exemplary report is described below.

Figure 8:
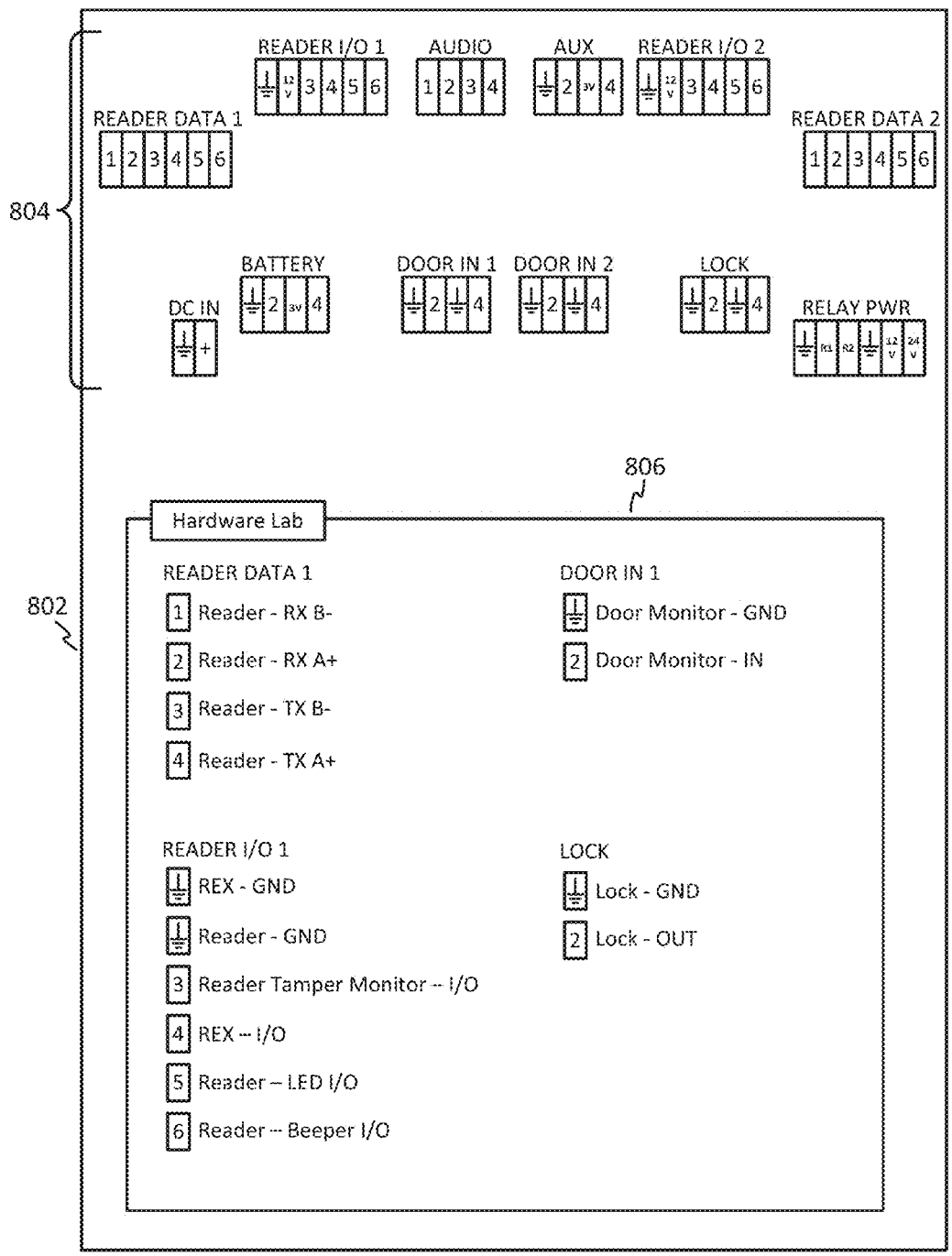
FIG. 8 is an exemplary report describing connections between individual pins associated with the controller and wires associated the selected peripheral device(s)

FIG. 8 is an exemplary report 802 describing connections between individual pins associated with the controller and wires associated the selected peripheral device(s). In the example shown in FIG. 8, the report may provide a layout representation 804 of the pin layout on circuit board 300 for controller 210. Layout representation 804 may act as a "map" to physically resemble the board layout, and identify particular pins with numbers and groups of pins (which may correspond to terminal blocks) with devices. In the example shown in FIG. 8, individual pins are identified by a device label (e.g., "Reader I/O 1," "Reader Data 2," etc.) and a pin number. Alternate approaches may be used, such as, for example, where each pin is provided a unique number and/or alphanumeric designation. In other embodiments, groups of pins (e.g., terminal blocks) may be color-coded according to the selected device. A pin configuration guide 806 may be provided for devices selected in the operational environment (e.g., "Hardware Lab"). The pin configuration guide 806 specifically designates, for the relevant wires on each selected device, an appropriate connection to each pin on circuit board 300. Pin configuration guide 806 may group the information by device and its various functions, and designate each pin with a label so a wire on the selected device may be identified and connected. As shown in configuration guide 806, each pin is designated with a signal name for each selected device.

Figure 9:
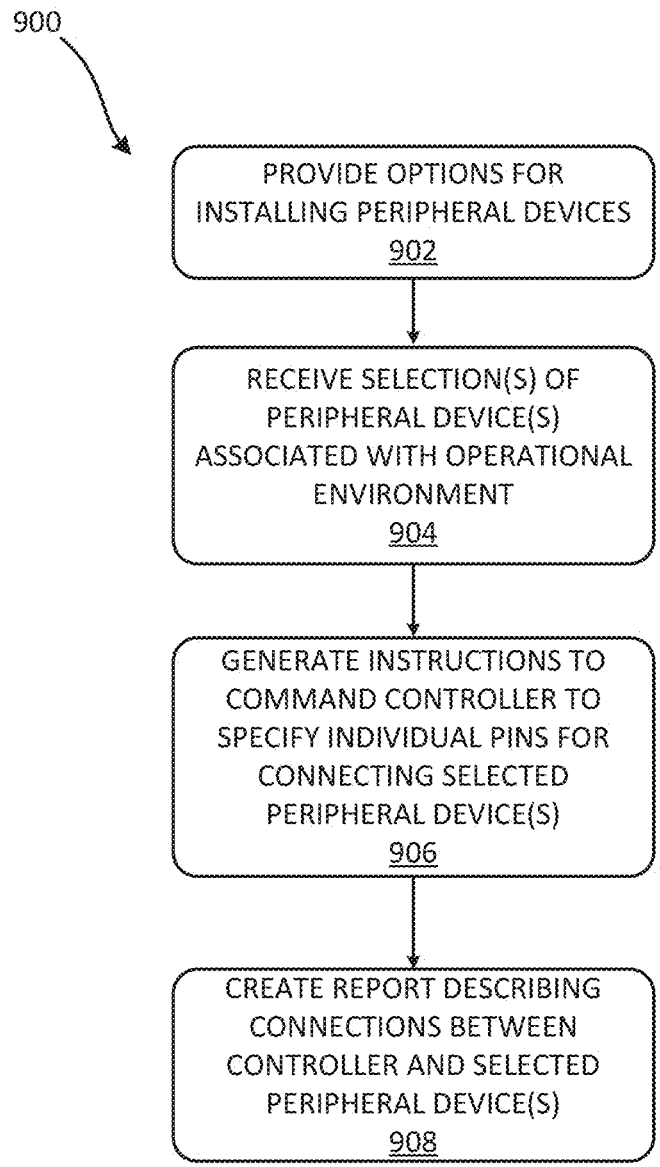
FIG. 9 is a flowchart of an exemplary process for configuring an installation of a control system within an operational environment.

FIG. 9 is a flowchart of an exemplary top-level process 900 performed by the configuration assistant. Process 900 facilitates the configuration of system unit 115 within an operational environment, and may execute on the administration device 130, in one or more controllers 210, in an offline processor, or combinations thereof. Process 900 may request information from the user which includes information regarding the controller 210, the environment in which it will operate, and which peripheral devices are to be installed and configured.

Process 900 initially provides options for installing peripheral devices compatible with controller 210 (block 902), and receives information regarding the selection of peripheral devices 230 associated with their operational environment (block 904). Interactions between block 902 and block 904 may take place, as the collected information may be gathered step-by-step from the user since options for subsequent selections may depend on prior selections. For example, subsequent selections and options in the configuration assistant may depend on what hardware devices were selected in a previous step, such as the electrical protocols for a particular card reader. Additionally, the configuration assistant can limit the number of options in several steps to simplify the process for the user, where some limitations may be selected to include the most common and/or sensible implementations. Some limitations could be based on the maximum possible number of specific peripheral devices which may be connected to controller 230. In a different example, some configurations may be limited based on the number and/or types of available connectors, wiring, and/or other constrains an installer in the field could encounter. In various embodiments, these limitations may be configurable by a system administrator. Alternatively, such limitations may be hardcoded in the configuration assistant and thus may be defined, for example, by the producer of controller 210.

In another embodiment, selections may be performed based on the electrical characteristics of peripheral devices 230 compatible with controller 210. Here, the selections may be based on standard data communication protocols used by a class of peripheral devices. For example, the user may select a combination of data transmission standards (e.g. RS232, RS485 or Vigan) and/or protocol (i.e. OSDP/HADP) for each of the peripheral devices 230 that are otherwise compatible with controller 210. In this embodiment, the user does not directly request a specific peripheral device 230 itself, but instead the configuration assistant provides options for specific peripheral devices 230 compatible with the user-selected standards and/or protocols. The options for peripheral device 230 may be presented because the configuration assistant has knowledge of what peripheral devices 230 work with the selected standard and/or protocol. The selection process in the configuration assistant may be made using a tree structure, but may also be implemented in a table form where all selectable permutations are present.

The configuration assistant may provide options allowing both simple and complex configurations and installations. As described in relation to FIGS. 7A and 7B, a configuration for a simple system unit 115 may include single door access control using a card reader and/or a pin code reader. Other systems may be more complex, and could include iris scanners or may employ other types of credentials by integrating surveillance cameras, light and fan switches, access to computer systems, time clocks, etc. Finally, the configuration assistant can provide information regarding the operational environment of a selected perioral device 230. As noted above in the example shown for the door lock in FIG. 7A, the number of doors that the door lock controls may be specified. Alternatively, the number of controllers associated with each door may be provided if multiple controllers are used. In a different example utilizing an image sensor, the user may specify the sensor's field of view, or for a thermal sensor, the nominal ambient temperature of the room where the thermal sensor is placed.

Further referring to FIG. 9, once all of the selections have been received, the configuration assistant generates instructions to command controller 210 to specify individual pins (from the plurality of pins on circuit board 300) for connecting the controller 210 to the selected peripheral device(s) 230 (block 906). The individual pins are specified using a generated "pin configuration," which informs controller 210 to select a particular pin residing on circuit board 300 for which a connection will be established, and may further specify an electrically configuration of the pin. The electrical configuration may include specifying whether the pin be assigned a signal, a power line, or a ground line. If a signal is specified, the electrical configuration may further include the signal's electrical parameters (e.g., voltage, frequency, current, etc.), associated standard(s), and/or protocol(s). As described below in reference to FIG. 10, controller 210 internally configures itself based on the pin configuration. As mentioned above, the instructions generated by the configuration assistant to command the controller may in one embodiment include calls to an Application Programming Interface (API). In another embodiment, the configuration assistant generates instructions to command the controller in the format of, for example, a list, a vector and/or a table of parameters. The parameters together with their format would in this case, when transferred to the controller, be the generated instructions commanding the controller to specify individual pins for connecting the controller to the selected peripheral device(s).

Process 900 may create a report based on the pin configuration, which permits the user to establish the actual connections between controller 210 and peripheral devices 230 (block 908). The report may be provided on a display of the administrative device 130 and/or presented as a hardcopy. An exemplary report is illustrated in FIG. 8, which can include graphical layouts displaying representations of the pin configuration on the controller, and the associated electrical connections to the wires associated with the peripheral devices. In some embodiments, the report may be generated after controller 210 internally configures itself based on the pin configuration, thus permitting that any manual modifications made after the configuration by the configuration assistant may be included in the report. In other embodiments, the report may be generated prior to the internal configuration of controller 210, and thus is capable of "offline use."

Figure 10:
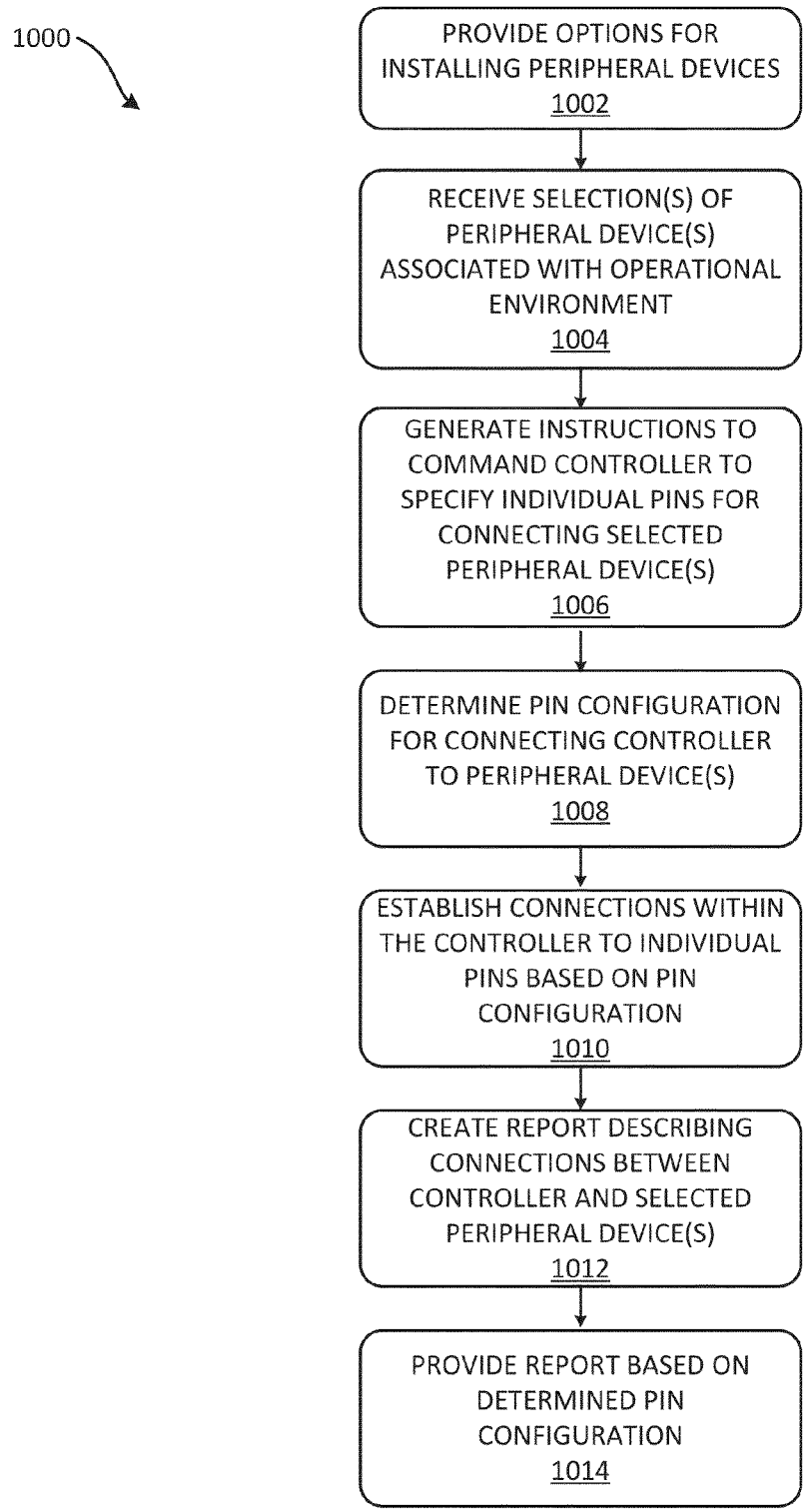
FIG. 10 is a flowchart of an exemplary process for configuring an installation of a control system which may execute on a controller.

FIG. 10 is a flowchart of an exemplary process 1000 for configuring an installation of a system unit 115. Process 1000 may execute on controller 210. A user, having the appropriate credentials, may access controller 210 by logging into controller 210 using administration device 130. Controller 210 access may be provided over network 120, or using another electrical interconnect, such as, for example, a locally established serial connection. In an embodiment, the administration device 130 uses a web-based GUI to permit the user to interact with controller 210, and provide various input/output functionality for the user. Process 1000 may initially provide options for installing peripheral devices 230 (block 1002). These options may be provided to administration device 130 for display. Using the web-based GUI, the user may enter selections for peripheral devices and information regarding their operating environment. Controller 210 receives these selections from administrative device 115 over network 120 (block 1004). Blocks 1002 and 1004 are similar to blocks 902 and 904 as described above in the discussion of FIG. 9.

Process 1000 may then generate instructions to command controller 210 to specify individual pins (from the plurality of pins on circuit board 300) for connecting the controller 210 to the selected peripheral device(s) 230 (block 1006). As noted above, specifying individual pins may include the actual selection of individual pins for a particular peripheral device. Specifying individual pins may further include defining the electrical configuration of the signals associated with the selected pins The electrical configuration may include particular protocol(s) compatible with a selected peripheral device, and/or various electrical characteristics which may be user-selectable. User selectable electrical characteristics may include, for example, signal polarities, voltage levels, etc., and may be associated with a particular operating environment. In other embodiments, the specification of individual pins include options for not using specific pins for establishing connections.

Based on the instructions generated in block 1008, the controller 110 may determine a "pin configuration" for connecting controller 110 to the selected peripheral devices (block 1008). As noted above, the pin configuration informs controller 210 how to select a particular pin residing on circuit board 300 for which a connection will be established, and may further specify an electrically configuration of the pin. The electrical configuration may include specifying whether the pin be assigned a signal, a power line, or a ground line. If a signal is specified, the electrical configuration may further include the signal's electrical parameters, associated standard(s), and/or protocol(s). Controller 210 may determine the pin configuration by performing an algorithm to reduce the complexity of wiring between controller 210 and peripheral device(s) 230. The algorithm may simplify the wiring by grouping connections associated with a particular peripheral device 230 to the adjacent sets of pins, and/or within one or more terminal blocks. The algorithm may include an optimization algorithm to reduce the complexity of the connections. One approach for reducing the complexity of the connections may be having the optimization algorithm select the individual pins which reduce connection lengths for each peripheral device. In this regard, an exemplary algorithm may attempt to reduce a distance metric between connections for one or more peripheral devices. For example, the algorithm may attempt to place connections associated with a particular peripheral device as close to each other as possible. If the closest connection is unavailable, the "next closest connection" may be tried. In another embodiment, "a greedy algorithm" may be used. The greedy algorithm builds up a solution piece by piece, and typically selects the next option that offers the most obvious and immediate benefit, without regard for any information from prior selections or subsequent selections. In other embodiments, any type of optimization algorithms may be used to reduce the complexity of the connections between the controller 110 and the peripheral devices 230.

The controller 110 may then configure itself internally by establishing connections within the processor IC 302 based on the pin configuration (block 1010). Also based on the pin configuration, controller 210 may create the report describing the connections between the controller 210 and the selected peripheral devices 220 (block 1012). Because the report is produced based on the pin configuration, it may be created prior to the controller 210 configuring itself. In some embodiments, the internal configuration of the controller in block 1010 may be omitted. In this case, the pin configuration may simply be written to a file and stored on-board, which could permit offline configurations of other controllers having the same peripheral devices 230 deployed in similar environments. Alternatively, the pin configuration file may be deployed to other system units 115 over network 120 to "batch configure" system units 115 having similar configurations and environments. Finally, the controller provides a report to assist the user in connecting the selected peripheral devices to the controller 210 (block 1014). An example report is described above and shown in FIG. 8. In an embodiment, the report may be provided to administration device 130 over network 120. In another embodiment, where the administration device 150 is not a separate unit, but is part of the system unit 115 itself, a report may be provided to the user in an alternative manner. For example, the report may be shown on a display which is part of system unit 115

Finally, aspects of process 1000 may be used to reconfigure system unit 115 after an initial configuration is performed. Reconfiguration may permit a user to make alterations in the configuration of system unit 115 without having to rework the entire configuration and installation. This may, for example, permit an installer to make minor changes to the electrical configuration (e.g., change a polarity). In another example, a reconfiguration may permit a user to add a new peripheral device without having to remove or reconfigure the connections already established with the existing peripheral devices. In such an embodiment, the configuration assistant may avoid the specification of individual pins which are already used in established connections to existing peripheral devices.

Figure 11:
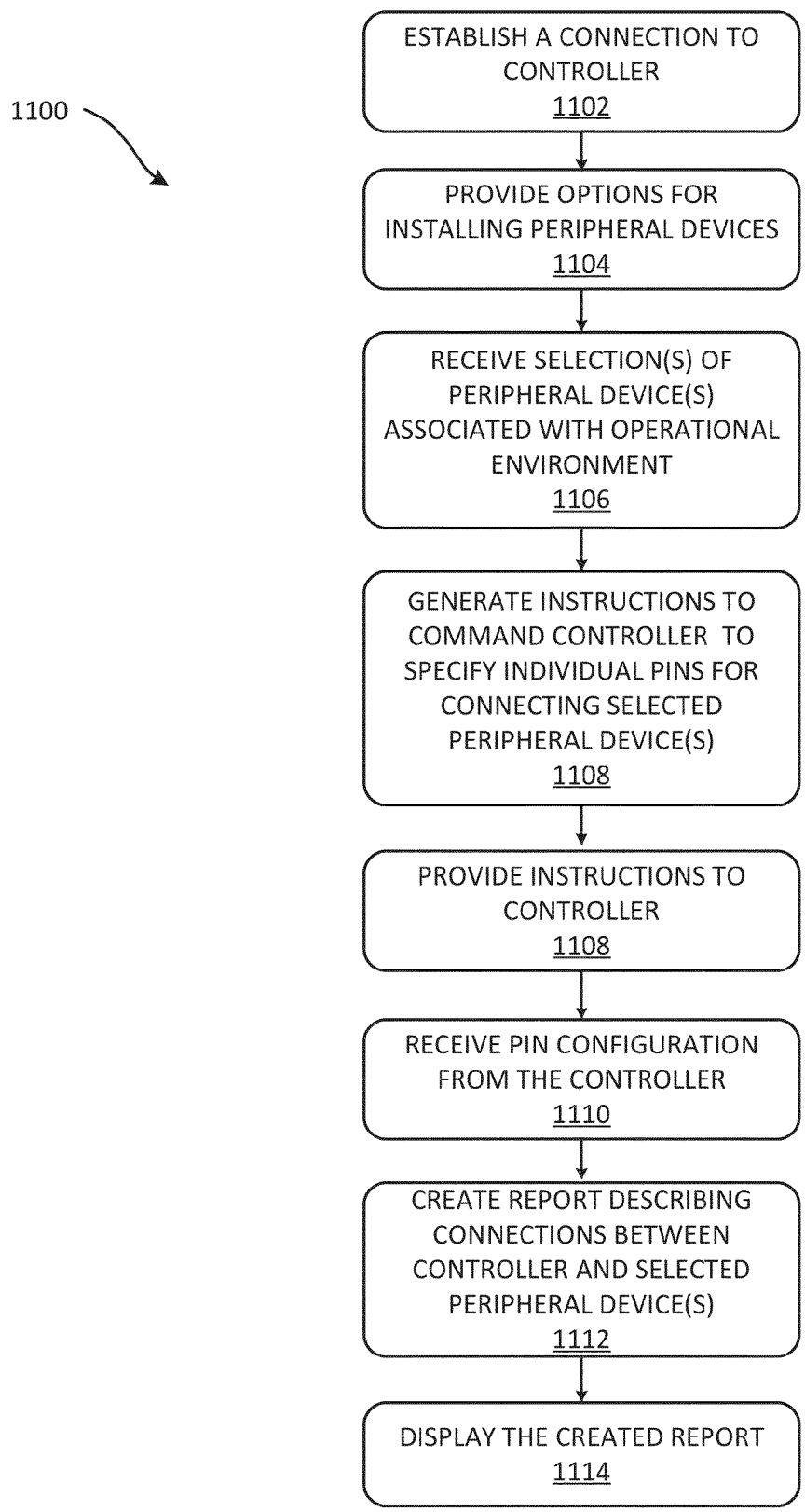
FIG. 11 is a flowchart of an exemplary process for configuring an installation of a control system according to an embodiment.

FIG. 11 is a flowchart of an exemplary process 1100 for configuring an installation of a system unit 115 for an operational environment. In this embodiment, the configuration assistant executes on administration device 130. The administration device 130 may communicate to the controller 210 over network 120, and initially establishes a connection to controller 210 (block 1102). Alternatively, administration device 130 can establish communication over a local connection to controller 210, such as, for example, as serial connection. Establishing the connection may be done within the configuration assistant, which can use a web-based GUI to interact with the user. In an embodiment, each system unit 115 in the distributed control system can be individually configured by logging into each system unit 115 separately.

Process 1100 may provide options to the user for installing peripheral devices 230 (block 1104) and receive selection(s) of peripheral devices associated with their operating environment (block 1106). As noted above, the interaction with the user and administration device 130 may take place using a GUI, such as, for example, a web-based interface. Blocks 1104 and 1106 are similar to blocks 902 and 904 as described above in FIG. 9. Process 1100 may then generate instructions to command controller 210 to specify individual pins (from the plurality of pins on circuit board 300) for connecting the controller 210 to the selected peripheral device(s) 230 (block 1108). In this embodiment, the administration device does not generate the pin configuration itself, but offloads the task to controller 210 by providing the appropriate instructions which are based in-part on the selections made by the user. To simplify the generation of the instructions, the configuration utility may use an API designed to work with controller 210 for generating the pin configuration as provided above in the description of FIG. 10.

Once the pin configuration is generated, administration device 130 may receive the pin configuration from the controller 210 (block 1110). Using information from the pin configuration, administration device 130 creates a report describing the electrical connections between each pin on circuit board 300 and the appropriate wire on each selected peripheral device (block 1112). Administration device 130 may display the report to the user (block 1114) and/or provide a hardcopy. An example report is discussed above in the description of FIG. 8.

Figure 12:
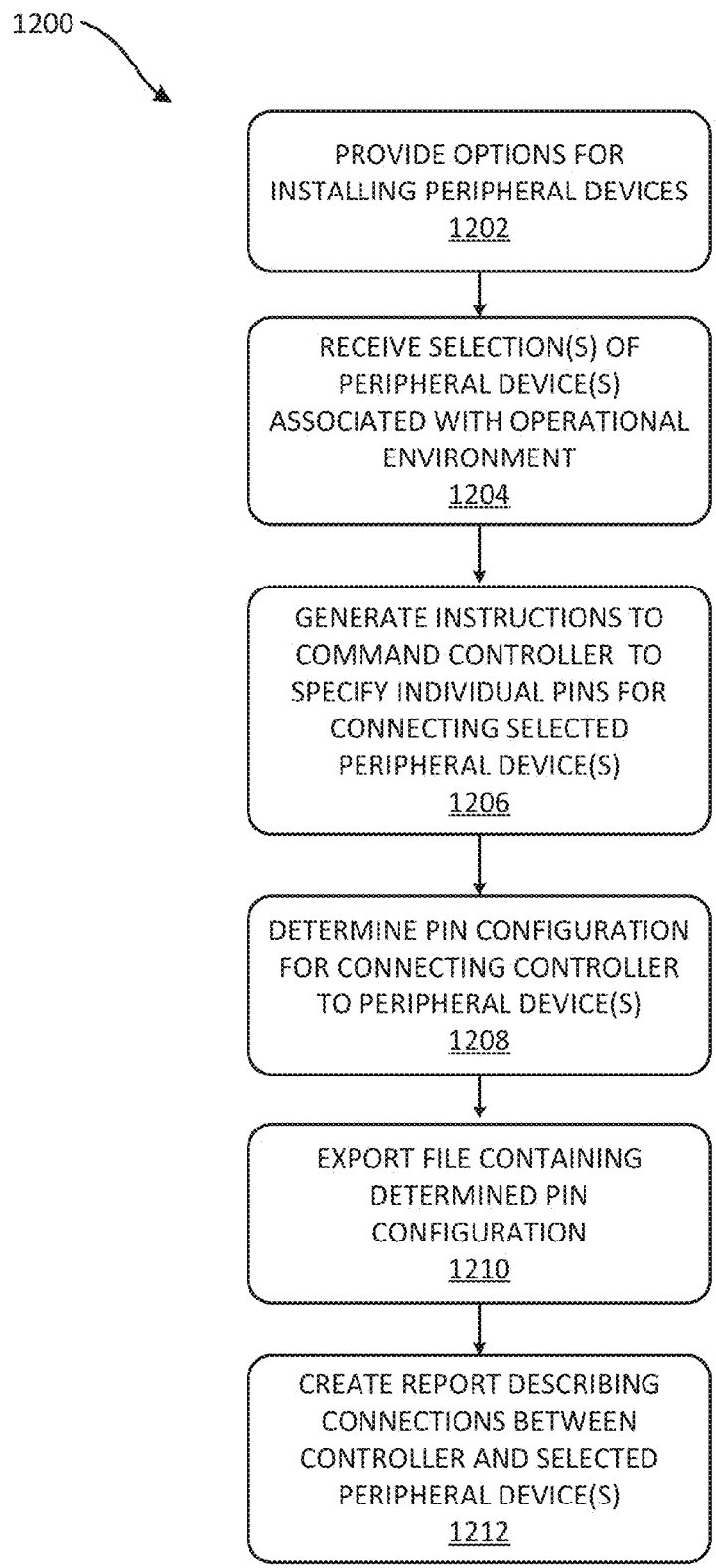
FIG. 12 is a flowchart of an exemplary process for configuring an installation of a control system according to another embodiment.

FIG. 12 is a flowchart of an exemplary process 1200 for configuring an installation of system unit 115 according to another embodiment. Process 1200 may execute on administration device 130. In this embodiment, administration device 130 generates the pin configuration information in addition to running the configuration assistant. The pin configuration may be written to a file and later used by one or more controllers 210 for performing the internal configuration of processor IC 302. Accordingly, this embodiment permits "off line" execution of the configuration assistant, where process 1200 may be performed while not connected to controller 210. This further permits "batch" configuration operations, where a user can run the configuration assistant once, and the pin configuration file may be used on multiple controllers 210, each having configurations with common peripheral devices operating in similar environments.

Process 1200 may provide options to the user for installing peripheral devices 230 which are compatible with controller 210 (block 1202), and receive selection(s) of peripheral devices associated with their operating environment (block 1204). As noted above, the interaction with the user and administration device 130 may take place using a GUI, such as, for example, a web-based interface. Blocks 1202 and 1204 are similar to blocks 902 and 904 as described above in FIG. 9. Process 1200 may then generate instructions to configure controller 210 to specify individual pins (from the plurality of pins on circuit board 300) for connecting the controller 210 to the selected peripheral device(s) 230 (block 1206). In this embodiment, the generated instructions to command the controller may include, for example, in a format which includes a list, a vector and/or a table of parameters. The parameters together with their format would in this case, when transferred to the controller, be the generated instructions commanding the controller to specify individual pins for connecting the controller to the selected peripheral device(s). The administration device determines the pin configuration information itself, and does not rely on controller 230. The determination of the pin configuration may be similar as described above in reference to block 1008 shown in FIG. 10 (block 1208). Once determined, the administration device 130 exports the pin configuration to a file for later use (block 1210). Using the pin configuration information, the administration device 130 creates a report describing the electrical connections between each pin on circuit board 300 and the appropriate wire on each selected peripheral device (block 1212). Administration device 130 may subsequently display the report to the user as shown, for example, in FIG. 8, and/or provide a hardcopy. The exported configuration file may be provided to controllers 210 on-site at a later time so their processor ICs 302 can be internally configured. This approach can be useful in situations where a controller is isolated from an external network in its operational environment. In other embodiments, the exported configuration file may be provided to additional controllers 210 in a peer-to-peer manner.

This application incorporates by reference the following applications filed the same day as the present patent application: titled "Event Timeline Generation"; titled "Anonymous Decisions in an Access Control System"; titled "Consensus Loss in Distributed Control Systems"; titled "Joining a Distributed Database"; titled "Distributed Events in an Access Control System"; titled "Managing Application Data in Distributed Control Systems"; titled "Distribution of User Credentials".

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 9 through 12 the order of the blocks and/or signal flows may be modified in other implementations. Further, non-dependent blocks and/or signal flows may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method for configuring an installation of a control system within an operational environment, comprising:
    providing options for installing peripheral devices compatible with a controller;
    receiving selections based on the provided options, wherein the selections are associated with an operational environment of at least one selected peripheral device;
    generating instructions to command the controller to specify individual pins from a plurality of pins for connecting the controller to the at least one selected peripheral device, wherein to specify individual pins from the plurality of pins, the controller is further commanded to select the individual pins from the plurality of pins, and electrically configure at least one individual pin from the plurality of pins; and
    creating a report to describe connections between the specified individual pins associated with the controller and wires associated with the at least one selected peripheral device.

2. The method of claim 1, wherein the method executes on the controller and further comprises:
    determining, based on the generated instructions, a pin configuration for connecting the controller to the at least one selected peripheral device;
    establishing connections within the controller to individual pins based on the determined pin configuration; and
    providing the created report which is based on the determined pin configuration.

3. The method of claim 1, wherein the method executes on an administration device and further comprises:
    establishing a connection to the controller;
    providing the generated instructions to the controller;
    receiving pin configuration information from the controller; and
    displaying the created report, wherein the created report is based on received pin configuration information.

4. The method of claim 1, wherein the method executes on an administration device, further comprising:
    determining, based on the generated instructions, a pin configuration from the plurality of pins for connecting the controller to the at least one selected peripheral device; and
    exporting a file which contains the determined pin configuration.

5. The method of claim 1, wherein the selections may be based on specific types of peripheral devices, or standard data communication protocols used by a class of peripheral devices, and further wherein the selections comprise a number of doors in the operational environment, or a number of controllers associated with each door, or a combination thereof.

6. The method of claim 2, wherein determining the pin configuration further comprises:
    performing an algorithm to reduce the complexity of wiring between the controller and the at least one peripheral device.

7. The method of claim 2, wherein subsequent reconfigurations of the control system which introduce additional peripheral devices further comprises:
    avoiding the specification of individual pins which are already used in established connections.

8. The method of claim 2, wherein the specification of individual pins include options for not using specific pins for establishing connections.

9. The method of claim 3, wherein the report is displayed prior to the controller having established connections to the individual pins.

10. The method of claim 4, further comprising:
    establishing a connection to the controller over a network; and
    providing the exported file to command a controller to establish connections therein based on the determined pin configuration.

11. The method of claim 2, wherein the report further comprises graphical layouts displaying representations of the pin configuration on the controller, and the associated electrical connections to the wires associated with the peripheral devices.

12. The method of claim 6, wherein the plurality of pins are separated into distinct groups which are arranged in terminal blocks, and further wherein the algorithm groups connections associated with a particular peripheral device to the same terminal block.

13. The method of claim 12, wherein the algorithm is an optimization algorithm to reduce the complexity of the connections between the controller and the at least one peripheral device, and further wherein the optimization algorithm selects the individual pins which reduce connection lengths for each peripheral device.

14. An apparatus for configuring an installation of a control system within an operational environment, comprising:
   a processor; and
   a memory, coupled to the processor, which stores software instructions causing the processor to
      provide options for installing peripheral devices compatible with a controller,
      receive selections based on the provided options, wherein the selections are associated with an operational environment of at least one selected peripheral device,
      generate instructions to command the controller to specify individual pins from a plurality of pins for connecting the controller to the at least one selected peripheral device, wherein to specify individual pins from the plurality of pins, the controller is further commanded to select the individual pins from the plurality of pins, and electrically configure at least one individual pin from the plurality of pins, and
      create a report to describe connections between the specified individual pins associated with the controller and wires associated with the at least one selected peripheral device.

15. The apparatus of claim 14, wherein the processor is included within the controller, and the software instructions further causes processor to
   determine, based on the generated instructions, a pin configuration for connecting the controller to the at least one selected peripheral device,
   establish connections within the controller to individual pins based on the determined pin configuration, and
   provide the created report which is based on determined pin configuration.

16. The apparatus of claim 14, wherein the processor is included within an administration device, and the software instructions further cause the processor to
   establish a connection to the controller,
   provide the generated instructions to the controller,
   receive pin configuration information from the controller, and
   display the created report, wherein the created report is based on received pin configuration information.

17. The apparatus of claim 14, wherein the processor is included within an administration device, and the software instructions further cause the processor to
   determine, based on the generated instructions, a pin configuration from the plurality of pins for connecting the controller to the at least one selected peripheral device, and
   export a file which contains the determined pin configuration.

18. The apparatus of claim 14, wherein the selections may be based on specific types of peripheral devices, or standard data communication protocols used by a class of peripheral devices, and further wherein the selections further comprise a number of doors in the operational environment and a number of controllers associated with each door.

19. The apparatus of claim 15, wherein determining the pin configuration further causes the processor to
   perform an algorithm to reduce the complexity of wiring between the controller and the at least one peripheral device.

20. The apparatus of claim 15, wherein the specification of individual pins include options for not using specific pins for establishing connections.

21. The apparatus of claim 16, wherein the report is displayed prior to the controller having established connections to the individual pins.

22. The apparatus of claim 17, wherein the software instructions further cause the processor to
   establish a connection to the controller over a network, and
   provide the exported file to command a controller to establish connections therein based on the determined pin configuration.

23. The apparatus of claim 15, wherein the report further comprises graphical layouts displaying representations of the pin configuration on the controller, and the associated electrical connections to the wires associated with the peripheral devices.

24. The apparatus of claim 19, wherein the plurality of pins are separated into distinct groups which are arranged in terminal blocks, and further wherein the algorithm groups connections associated with a particular peripheral device to the same terminal block.

25. The apparatus of claim 24, wherein the algorithm is an optimization algorithm to reduce the complexity of the connections between the controller and the at least one peripheral device, and further wherein the optimization algorithm selects the individual pins which reduce connection lengths for each peripheral device.

* * * * *